March 23, 1943. W. M. ERICSON 2,314,329
ART OF SPRAYING COATINGS, PARTICULARLY ASPHALTIC COATINGS AND THE LIKE
Filed March 12, 1938
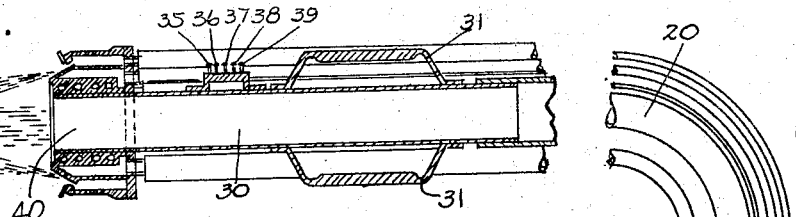
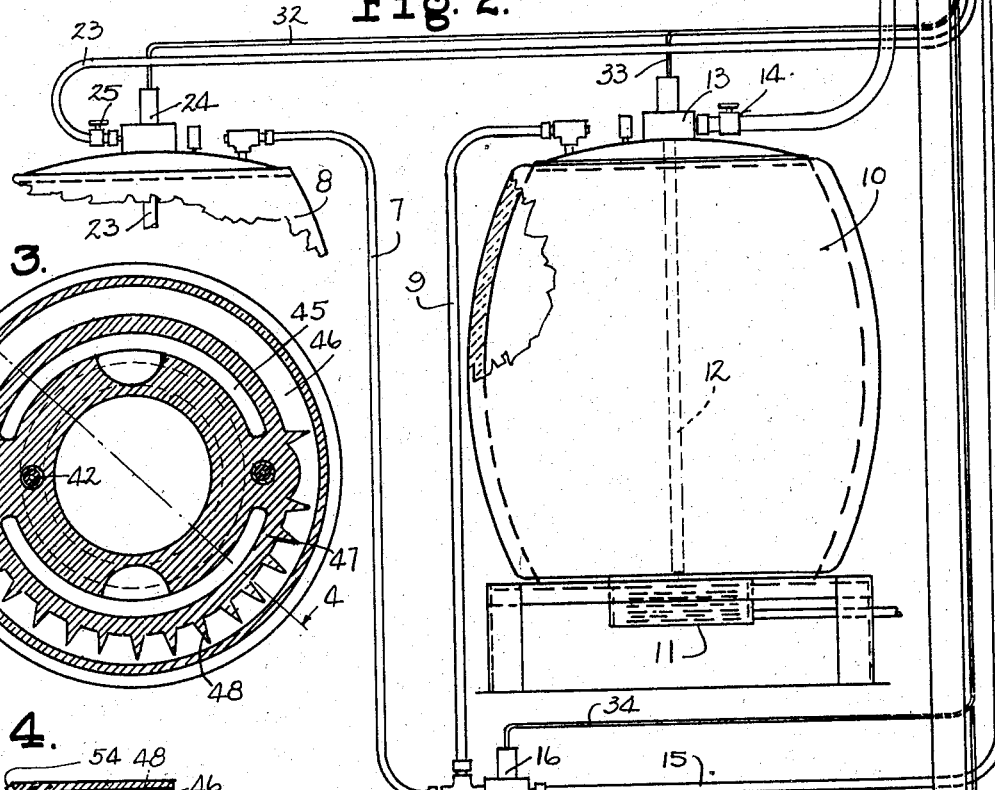
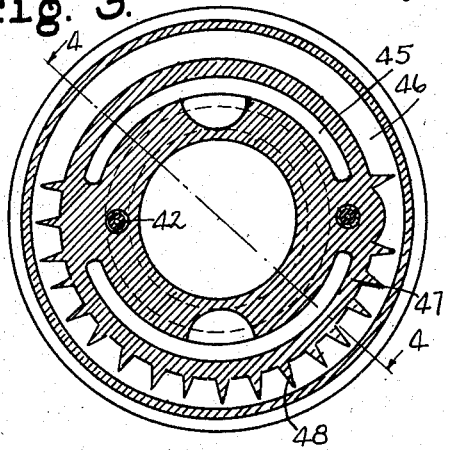
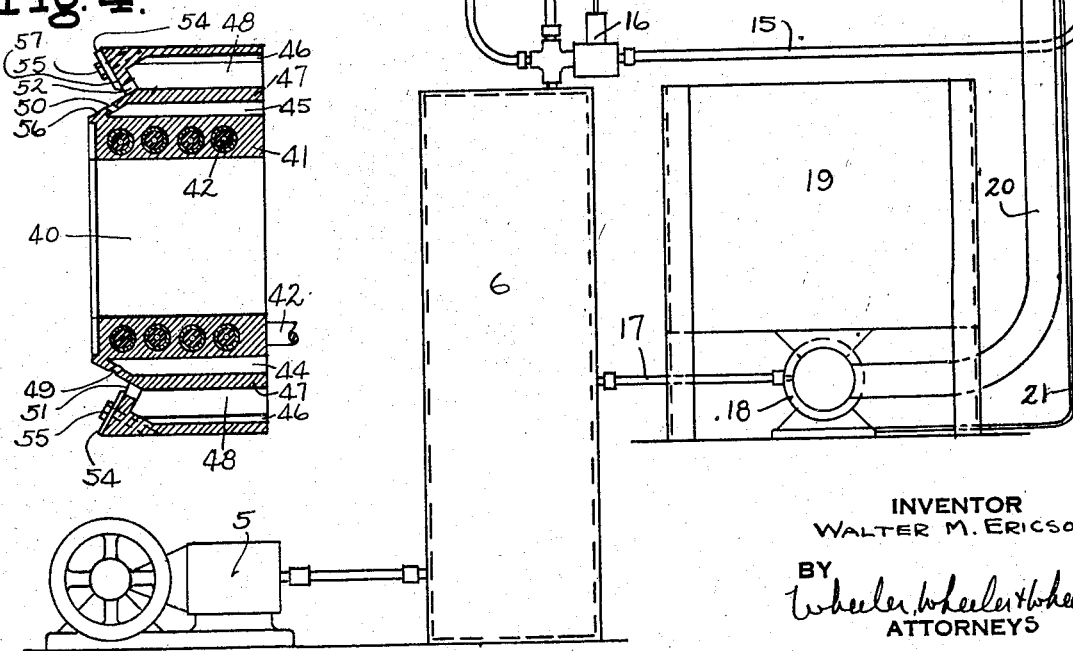
INVENTOR
WALTER M. ERICSON
BY
Wheeler, Wheeler & Wheeler
ATTORNEYS Patented Mar. 23, 1943

2,314,329

UNITED STATES PATENT OFFICE 2,314,329

ART OF SPRAYING COATINGS, PARTICULARLY ASPHALTIC COATINGS AND THE LIKE

Walter M. Ericson, Milwaukee, Wis.

Application March 12, 1938, Serial No. 195,525

12 Claims. (Cl. 117—104)

This invention relates to improvements in the art of spraying coatings, particularly asphaltic coatings and the like. The invention has wide application to numerous fields of use including waterproofing, the application of binder coatings, thermal and acoustical treatment, rust-proofing, etc.

One of the primary objects of the invention is to provide a means and process by which a stable, fast drying coating may be pneumatically applied. Asphalt is available in a number of forms of pneumatic spraying. It has been sprayed in the form of an asphalt emulsion with water but, particularly when any water-absorbent material is present, such an emulsion is very slow drying and in many installations is objectionable on that account. Asphalt has also been heated to render it sufficiently fluid to be pneumatically sprayed. In its pure form the asphalt thus applied is not sufficiently stable to serve many purposes of the present invention as it softens sufficiently to flow when exposed to the sun at ordinary atmospheric summer temperatures.

Pure asphalt is the primary ingredient preferably sprayed in accordance with the present invention, but it is my purpose to render the sprayed coating more stable by adding other materials to it, preferably while it is unsupported enroute between the spray nozzle and the point of application. A variety of material may be added for this purpose. Aside from the purely mechanical action of fibrous binders, I may use any one of a number of ingredients which tend to build up a crystalline structure in the asphalt which is resistant to flow.

In addition, and very important to the invention, is the concurrent spraying and admixture in free space of hot asphalt and asphalt emulsion or some other material, usually having an evaporable component, for effecting virtually instant set of the molten asphalt. It would be impossible to mix these materials in a tank or to apply them successively to get the precise desired result. The hot asphalt is at a temperature such that it instantly turns to steam the water in the emulsion, thus eliminating the drying problem, and the evaporation of the water reduces the temperature of the hot asphalt sufficiently to cause it to set instantly upon reaching the work. The resulting coating, even apart from non-asphaltic ingredients, is very much improved as to stability as compared with any previously known hot asphalt coating, thus realizing one of the major objectives of the present invention.

The more detailed purposes of the invention will be more apparent from the following disclosure.

In the drawing:

Figure 1 shows in axial section a preferred type of nozzle for carrying out this invention.

Figure 2 is a view illustrating diagrammatically in side elevation and partially in section the various supply vessels and connections serving the nozzle shown in Fig. 1, Fig. 2 being drawn to a smaller scale.

Figure 3 is a greatly enlarged detail view in cross section to the nozzle near its rear end.

Figure 4 is an enlarged detail view of the nozzle in axial section similar to that in Fig. 1.

Like parts are identified by the same reference characters throughout the several views.

In the system diagrammatically illustrated in Fig. 2 no attempt has been made to show details of ancillary fittings such as might be regarded as desirable by the man skilled in the art. I have only indicated those major pieces of apparatus desirable for an understanding of the process invention herein disclosed.

The device shown at 5 represents an air compressor supplying the compressed air to tank 6. From the source of compressed air supply pipe 7 leads to a barrel or other storage chamber 8 which is closed so that the contents can be subjected to pressure. A similar pressure supply line 9 leads to storage chamber 10. This chamber, at least, is supplied with a burner 11 by means of which its contents may be heated, this being the chamber from which the hot asphalt is delivered by air pressure through pipe 12 under control of a solenoid valve 13 and a manually adjustable valve 14.

A third air line 15 under the control of solenoid valve 16 leads directly to the nozzle hereinafter to be described. A fourth air line 17 leads to the motor driven charging valve 18 which is located beneath a supply hopper 19 for dry materials such as will hereinafter be described. The relatively large conduit 20 leads from the charging hopper for the pneumatic delivery of the dry materials to the nozzle when the motor driven rotary charging valve 18 is in operation, its operation being controlled by the electric cable 21 leading thereto.

The contents of chamber 8 may be heated or not, as desired. The hose 23 leads from this chamber to the nozzle under control of solenoid valve 24 and manually operable valve 25. The adjustable valves used for regulating flow and shown at 14 and 25 may, if preferred, be associated directly with the nozzle.

The nozzle comprises a tubular support at 30 provided with handles 31 and with which the conduit 20 communicates. Upon this support are connected the various hoses and the cables 32, 33 and 34 for the actuation of solenoid valves 24, 13 and 16 respectively. Also mounted on the tubular support is a series of switches 35, 36, 37, 38 and 39 which respectively control the heating element hereinafter to be described and the energization of the electric cables 32, 33, 34 and 21.

The nozzle proper comprises a central tubular discharge opening 40 in direct open communication with the tubular support 30 through which the dry materials, if any, are pneumatically delivered. Surrounding this is an annular casting 41 in which I provide a source of heat which may conveniently comprise a metal sheathed heating element 42 of the type known commercially as "Calrod" and which may be cast into the metal.

Directly surrounding the heating element I provide narrow arcuate channels 44 and 45 for the several fluid ingredients to be separately sprayed. Outside of these passages is an annular air passage 46 supplying air for the spraying of both of the component liquid materials, the partition wall 47 being preferably provided with a series of heat radiating fins 48 disposed on at least one side of the air passage 46 to heat to a high temperature that air which is to be used in spraying the liquid which requires a great deal of heat.

At the face of the nozzle, as best shown in Fig. 4, I drill at least one hole 49 into the liquid passage 44 and a similar hole 50 into liquid passage 45. The two ports thus formed have their axes divergent symmetrically from each other and from the axis of the central tubular passage 40. The extent of the arcuate tubular passages provided at 44 and 45 in the nozzle for liquids is such that more ports may be drilled if desired. It has, however, been found expedient that these ports should be symmetrically arranged.

Other holes are drilled at 51 and 52 into the air chamber 46. The air ports thus made are directly associated with the liquid ports 49 and 50 to discharge air transversely of the stream of liquid at an angle which may range from 20 degrees to 90 degrees but is preferably substantially at the angle illustrated. The supply of air flow is regulated at each port individually by means of a gate 54 which somewhat resembles a knife blade and is adjustably held by a bolt 55 in any desired position across the port. This blade preferably has a rather sharp edge, as this seems to promote effective atomization of the liquid. The blade is adjusted to the position in which the atomization is most satisfactory to the operator. The hose 12 leading from chamber 10 in which the contents are highly heated, leads to nozzle passage 44 as shown in Fig. 1. The hose 23 from chamber 8 leads to nozzle passage 45. The direct air connection 15 leads to nozzle passage 46.

The angles of the faces 56 and 57 of the nozzle head and the angles and positions of the ports 49, 50, 51 and 52 therein formed, are so chosen that the atomized jets of pneumatically borne liquids issuing from the nozzle will be symmetrically arranged around the nozzle axis and brought to a predetermined focus as indicated in Fig. 1. The word "focus" as loosely used herein, obviously is not to be taken as literally referring to a focal point, but rather as referring to an area within which the contents of the two jets both pass and are thoroughly commingled. This focus should preferably be rather close to the nozzle as the mixing of the several ingredients can then be more definitely controlled, and for the further reason that even with a high heat at the nozzle and the preheating of the ingredients requiring heat, it is impossible to maintain such ingredients at a high temperature for a protracted pneumatic travel through free space. If these parts are proportioned and organized as illustrated, there will be a thorough admixture of the atomized materials in free space and the materials will set almost instantly to produce a coating which will be stable at all atmospheric temperatures in accordance with the desired objectives of this invention.

The material dispensed from chamber 10 (which, as shown in the drawing, is preferably an insulated chamber) preferably comprises a hot asphalt. An asphalt designed for pneumatic spraying while softened by heat has a relatively low melting point. In order to render it completely liquid it is usually heated in practice to a temperature of approximately 450 degrees F.

Its melting point may be raised, if desired, for the purpose of facilitating the production of a more stable coating on the work. This may be done by adding an inert dust such as ground silica, sand, redwood bark dust, rock wool dust, micaceous dust, asbestos or diatomaceous earth. Bentonite is conveniently usable. The difficulty in using any such dust in the heretofore known methods of spraying hot asphalt has resided in the tendency of the dust to settle out before the asphalt fully sets. Because of the instant set which occurs in the practice of the present invention, dust may be mixed directly with the hot asphalt, if desired, without encountering this difficulty.

Chamber 8 may contain an emulsion of asphalt and water or, if desired, it may under many circumstances, contain sodium silicate or some other chemical capable in drying of creating a crystalline structure. It may be explained parenthetically that the crystals so distributed throughout the coating made up of hot asphalt resist any tendency of the asphalt to flow when it becomes softened at high atmospheric temperatures. The crystalline structure is apparently built up instantly when the atomized sodium silicate encounters the atomized hot asphalt, the heat of the asphalt being used to dry off the water from the sodium silicate.

In the preferred practice of the invention asphalt emulsion is delivered from chamber 8. The asphalt used in making up this emulsion has a much higher melting point than that which is intended to be sprayed hot. Its liquid quality which enables it to be handled in a spraying device is derived from its emulsified condition as distinguished from its temperature or melting point. It is an easy matter to further raise the melting point of emulsified asphalt by adding some neutral dust such as bentonite or any of the other dusts above enumerated. In the preferred practice of this invention I incorporate enough dust in the emulsion so that the temperature of the emulsion may be raised to about 150° in order that the emulsion may be this warm when sprayed to avoid a too abrupt setting of the asphalt which is sprayed while molten. If sodium silicate is employed in container 8 its temperature should likewise be raised to control the setting of the molten asphalt.

In addition to the dust which is dispensed in the finished coating for the purposes aforesaid, there are many instances where it is desirable to incorporate other solids in the coating either to increase its tensile strength or for any other reason. Animal, mineral or vegetable fibers or flakes, or irregular particles or masses may be incorporated in the coating by simply blowing the desired solids from hopper 19 pneumatically through the pipe 20 and through the center of the nozzle to the point of focus of the several jets of atomized liquids which are sprayed from the nozzle. Each particle so delivered becomes coated with the component liquids from the several sprays and the resulting coating or mat will be of uniform characteristics throughout, all solids being uniformly distributed homogeneously throughout the deposit.

It is very important to have heat available directly at the nozzle. In my work thus far I have found this to be desirable regardless of the temperatures to which the materials may be preheated. The materials lose their heat rapidly during their projection through space from the nozzle to the work and, in fact, it is one of the objectives of this invention that the highly heated molten asphalt should lose sufficient heat to set instantly on contact with the work. This objective is obtained so successfully that I use additional heat at the nozzle to keep the set from occurring prematurely.

I claim:

1. A method of producing a stable quick setting dry asphalt coating, said method including the spraying of molten asphalt in the form of a coating upon the work, the admixture with the molten asphalt occurring immediately in advance of the work and the conjoint delivery to the work in the same spray of a liquid material comprising a liquid carrier vaporizable at the temperature of said molten asphalt and a substance borne by said carrier and adapted mechanically to resist subsequent flow of said asphalt following its setting, said substance being selected from a group consisting of sodium silicate and non-molten asphalt of higher melting point.

2. An asphaltic spraying method which includes the atomization of molten asphalt, the pneumatic delivery of the atomized molten asphalt to the work in the form of a jet, and the pneumatic delivery into the same jet of a stabilizing material for rendering permanent the set of said asphalt, said material being in admixture with a liquid vaporizable at the temperature of the molten asphalt, and the consequent mixture of such material and liquid with the atomized molten asphalt in free space immediately prior to contact with the work, whereby to evaporate said liquid for the drying of said material while simultaneously cooling the molten asphalt to reduce the time of set thereof.

3. An asphaltic coating process comprising the conjoint delivery of two pneumatically propelled jets of material at least partially liquid toward a focal point of admixture and their subsequent application to the work, one of said jets comprising atomized molten asphalt and the other of said jets comprising material for inducing quick set and stabilization of the asphalt.

4. An asphaltic spraying method comprising the conjoint delivery to the work in a single spray, of separately originating pneumatic jets of atomized asphalt, the asphalt of one of said jets being a molten asphalt with relatively low melting point and the asphalt of the other of said jets being an emulsified asphalt relatively stable at atmospheric temperatures.

5. An asphaltic spraying process comprising the melting of asphalt to the point where it can be atomized, the atomization of the molten asphalt, the atomization of an emulsified asphalt, the delivery of the atomized molten asphalt and the atomized emulsified asphalt together in free space for thorough admixture, and the subsequent delivery of the admixed forms of atomized asphalt substantially immediately to a surface to be coated.

6. An asphaltic coating method involving the separate origination in several jets of atomized molten asphalt, and an atomized carrier and a carrier borne material for inducing quick and non-flowing set of said asphalt, said carrier including a liquid vaporizable at the temperature of said molten asphalt, and the delivery of said jets to a common point in advance of the surface to be coated, whereby to admix the atomized asphalt and carrier material of the several jets in free space.

7. An asphaltic coating method involving the separate origination in several jets of atomized molten asphalt and an atomized material for inducing quick set and a substance for maintaining fixation of said asphalt against subsequent flow, said material including a liquid vaporizable at the temperature of said molten asphalt, and the delivery of said jets to a common point in advance of the surface to be coated, whereby to admix the atomized asphalt and said substance and said material of the several jets in free space, and the separate origination of an additional jet of pneumatically borne solids and the delivery of said last mentioned jet likewise to said point for admixture with the asphalt and material and substance of the first jets aforesaid.

8. On asphaltic spraying method which comprises the separate origination of atomized jets of molten asphalt and of sodium silicate solution and the direction of said jets through a common focal point in advance of the surface to be coated, whereby to mix the materials of said jets in free space.

9. An asphaltic spraying method comprising the spraying of molten asphalt upon the work and the separate origination of a spray comprising a liquid solution of a crystalline salt and directing the separate spray upon the work conjointly with the spray of molten asphalt, admixing the two sprays immediately in advance of the work whereby to produce an asphalt coating stabilized by the distribution of salt crystals therethrough.

10. An asphaltic spraying method comprising the melting of asphalt to the point where it can be atomized, the atomization of the molten asphalt and the delivery thereof in the form of a spray upon the work, the atomization and delivery upon the work conjointly with said first mentioned spray of a separate spray comprising a crystalline salt in solution in a liquid vaporizable at the temperature of the molten asphalt, admixing the two sprays immediately in advance of the work whereby the vaporization of such liquid upon contact with the molten asphalt takes heat from the asphalt to contribute to the quick set thereof, leaving the salt distributed in crystalline form throughout the asphalt to render the asphaltic coating stable upon the work.

11. A method of producing a quick setting dry asphalt coating, said method including the melting of asphalt, the atomization and spraying of the hot molten asphalt upon the work and the admixture with the spray of hot molten asphalt in free space immediately in advance of the work, of finely divided liquid vaporizable at the temperature of the hot asphalt whereby the vaporization of such liquid upon contact with the asphalt eliminates the liquid and at the same time cools the asphalt for immediate set upon contact with the work.

12. A method of producing a stable quick-setting dry asphalt coating, said method including the melting of asphalt, the atomization and spraying of the hot molten asphalt upon the work, the admixture with a carrier, of a material for fixing the asphalt against subsequent flow, said carrier comprising a liquid vaporizable at the temperature of the hot molten asphalt, the spraying of such material and liquid carrier into the path of the atomized asphalt in free space immediately in advance of the work, whereby to distribute the material in the asphalt and to vaporize the carrier by the heat of the asphalt, thereby eliminating the carrier and producing quick-set of the asphalt upon the work with the material uniformly distributed therethrough.

WALTER M. ERICSON.